United States Patent [19]
Padula

[11] 3,771,565
[45] Nov. 13, 1973

[54] FLUIDIC DIRECTIONAL CONTROL VALVE ASSEMBLY

[75] Inventor: Lawrence Dominic Padula, New Britain, Conn.

[73] Assignee: Skinner Precision Industries, Inc., New Britain, Conn.

[22] Filed: Nov. 6, 1972

[21] Appl. No.: 304,213

[52] U.S. Cl. .......................................... 137/625.64
[51] Int. Cl. ............................................ F16r 11/07
[58] Field of Search ..................... 137/625.6–625.69

[56] References Cited
UNITED STATES PATENTS 3,315,702   4/1967   Passagio........................ 137/625.64
3,323,421   6/1967   Olmstead..................... 137/625.64 X Primary Examiner—Henry T. Klinksiek
Attorney—John M. Prutzman et al.

[57] ABSTRACT

Directional control valve having a ported body with a chamber, a spool reciprocable in the chamber, a flow passageway extending between a supply port and each end of the spool chamber, selectively operable valves in each flow passageway for alternately venting and pressurizing its respective end of the spool chamber, and a pair of spool balancing members engageable respectively with opposite ends of the spool and continuously urged under a biasing force of fluid under supply line pressure toward engagement with their respective ends of the spool.

11 Claims, 3 Drawing Figures

Patented Nov. 13, 1973

3,771,565

3,771,565

FLUIDIC DIRECTIONAL CONTROL VALVE ASSEMBLY

FIELD OF THE INVENTION

This invention generally relates to fluid valves and particularly concerns fluidic directional control valves of a general type described in my U.S. Pat. No. 3,523,555 entitled "Solenoid Controlled Four-Way Valve" issued Aug. 11, 1970 and assigned to the assignee of this invention.

BACKGROUND OF THE INVENTION

As requirements for high speed spool valve operation increases with increasing axial forces at maximum fluid flow rates, seemingly incompatible objects of reduced minimum operating pressures are encountered, sometimes with further requirements for low wattage operation, e.g., of a solenoid valve operator. Spring return of a valve spool to normal rest position frequently requires that the spring rate is high enough to effectively overcome frictional forces imposed on pressure surface areas of the valve spool for effecting spool movement as well as the maximum "O" ring frictional forces for sealing the spool. These "O" ring frictional forces are highest when the inlet pressure is at its maximum and, accordingly, require significantly greater forces to center the spool at maximum rated inlet pressure. This conventionally results in typical valve assemblies having increasingly larger springs for applying correspondingly larger spool return forces. Increasing the size of the return spring normally results in a valve assembly design of an overall increased size because of the required increased spring chamber space to accommodate the larger spring and, normally, a larger diameter actuating piston on the valve spool for a given minimum operating pressure. As a result, a larger solenoid valve operator is also required to operate the larger diameter actuating piston with equal speed, whereby the overall package size is undesirably increased with concomitant increases in costs of manufacture.

OBJECTS OF THE INVENTION

Accordingly, a primary object of this invention is to provide a new and improved fluidic directional control valve assembly capable of high speed valve operation under flow capacity conditions with minimum operating power requirements while at the same time achieving the seemingly incompatible aims of reduced minimum operating pressure in a compact assembly.

Another object of this invention is to provide such a new and improved valve assembly which is capable of providing long run reliability in a design quick and easy to manufacture and assemble at economical costs with minimum service requirements over an extended operating life.

Other objects will be in part obvious and in part pointed out in more detail hereinafter.

SUMMARY OF THE INVENTION

The valve assembly of this invention achieves the foregoing objects by the provision of auxiliary fluid spring compartments in the valve body at opposite ends of its spool chamber with the compartments in constant communication with the supply port for effecting a centering fluid bias on a pair of balancing pistons engageable with opposite ends of the spool for continuously urging it into a center rest position. The auxiliary fluid spring compartments additionally contain a spring which assists the fluid pressure forces on its respective spool balancing piston, whereby the centering force of such springs is sufficiently high to overcome the actuating piston frictional forces and the minimum "O" ring sealing frictional forces on the spool with zero gauge pressure at the supply port. The additional force requirements for centering the spool under applied inlet pressure operation is provided by the centering piston force effected by the fluid pressure forces acting on the centering piston which is proportional to the inlet supply line pressure.

A better understanding of the objects, advantages, features, properties and relationships of the invention will be obtained from the following detailed description and accompanying drawings which set forth an illustrative embodiment and is indicative of the ways in which the principle of this invention is employed.

DETAILED DESCRIPTION OF A PREFERRED EMBODIMENT OF THE INVENTION

Figure 1:
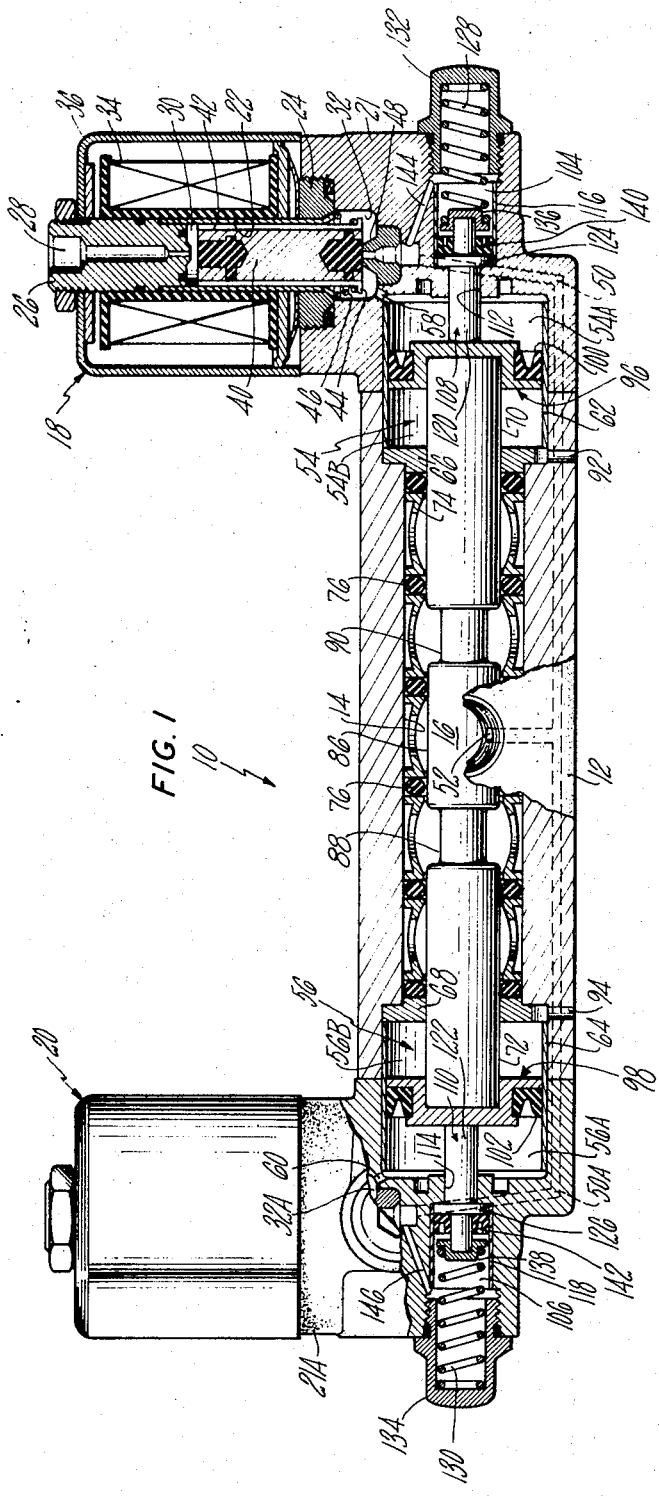
FIG. 1 is a side elevational view, partly broken away and partly in section, showing a preferred embodiment of a valve assembly constructed in accordance with this invention.

Referring to the drawing wherein a preferred embodiment of a valve assembly 10 of this invention is illustrated, a generally rectangular valve body 12 is shown having a cylindrical valve chamber 14 wherein a valve spool 16, preferably formed of high strength aluminum with a polished hardcoat surface, is received for axial reciprocating movements responsive to alternate operation of two solenoid pilot valve operators 18 and 20 of a type particularly suitable for use in valve assembly 10. The solenoid pilot valve operators 18, 20 described in connection with the preferred embodiment of this invention have been found to work satisfactorily. However, it is contemplated that other piloting may be utilized. Suitable modifications may be provided, for example, in utilizing external pilot pressure in separate auxiliary lines connected to the pilot valve operators and, if desired, modification may be provided for manual actuation of the operators. The solenoid pilot valve operators 18 and 20 are of identical construction. For an understanding of this invention only one of the operators need be described.

Suitable machine screws, not shown, may be used to secure a base portion 21 of operator 18 to the right hand end of body 12 as viewed in the drawing. Sleeve 22 is secured to base portion 21 by threaded collar 24, and an outer end of sleeve 22 has a nipple 26 fitted therein to provide an exhaust passage 28 for a chamber 30 jointly defined by sleeve 22 and a compartment 32 formed in base portion 21. Sleeve 22 is surrounded by a solenoid coil 34 enclosed by housing portion 36 suitably secured to base portion 21. Lead-in wires, not shown, for coil 34 are provided in accordance with conventional techniques and connect coil 34 to a suitable source of electrical power.

A reciprocable bi-positional armature 40 is received for sliding movement within sleeve 22, and longitudinally extending grooves such as at 42 along the peripheral surface of armature 40 permit free flow of fluid between armature 40 and sleeve 22. Armature 40 has a radial end flange 44. A compression spring 46 seated between flange 44 and a radially outwardly flaired end of sleeve 22 biases armature 40 downwardly (as viewed in the drawing) into compartment 32 and against an annular valve seat 48. Valve seat 48 is apertured to connect with an internal pilot flow passageway 50 leading to a supply port 52 in valve body 12. In the specifically illustrated embodiment, supply port 52 is shown formed intermediate the ends of body 12 in a central location with passageway 50 and another internal pilot flow passageway 50A leading in opposite longitudinal directions of body 12 from supply port 52 to opposite ends of body 12 to connect with compartments 32 and 32A of the respective solenoid pilot valve operators 18 and 20.

To selectively apply valve spool operating pressure to opposite ends of the valve spool chamber 14 as determined by selective energization of operators 18 and 20, opposite ends of the body 12 and connecting base portions 21 and 21A are formed to provide relatively enlarged end chamber portions or motor cylinders 54 and 56 each having a common inlet and exhaust orifice at 58 and 60 which are in direct communication with compartments 32 and 32A formed in base portions 21 and 21A of their respective operators 18 and 20. Cylinders 54, 56 each have a suitable lining 62, 64, preferably formed of stainless steel, and have seal retainers 66, 68 fixed at inner ends of each cylinder 54, 56. Retainers 66 and 68 are apertured to respectively surround lands 70 and 72 of spool 16 and retain seal cages such as at 74 in assembly. In the specifically illustrated embodiment, cages 74 axially fitted within chamber 14 about spool 16 with each cage 74 radially aligned with one of the ports for retaining the "O" ring seals such as at 76 in separated coaxially positioned relation within chamber 14 for independent sealing engagement with spool 16. Four ports 78, 80, 82 and 84 are shown, in addition to supply port 52, communicating with chamber 14 with the ports alternately disposed along the length of chamber 14, i.e., with the central supply port 52 formed on one side of chamber 14 between two exhaust ports 78 and 82 respectively servicing two working ports 80 and 84 formed on the opposite side of chamber 14.

While spools of different construction and bodies having different porting arrangements obviously may be utilized to effect proper intercommunication between ports, spool 16 in the preferred embodiment has a third land 86 interposed between the previously mentioned lands 70 and 72 and separated by a pair of axially spaced grooves 88 and 90 which are suitably dimensioned and spaced apart for alternately connecting supply port 52 to one of the working ports 80, 84 and exhausting the other through its respective exhaust port 78, 82 in accordance with the axial positioning of spool 16 upon selectively venting and pressurizing the outer compartments 54A, 56A of cylinders 54, 56 responsive to energization and selective de-energization of solenoid pilot valve operators 18, 20.

The seal retainers 66 and 68 are each suitably apertured to connect with bleed openings 92 and 94 in the body 12 for exhausting trapped air ahead of each actuating piston 96 and 98 fixed respectively on the opposite ends of spool 16. Fluid leakage between inner and outer cylinder compartments 54B, 54A and 56B, 56A is minimized, while accommodating manufacturing variations without close tolerance requirements, by providing annular seals 100, 102 fitted about a neck of each actuating piston 96, 98 to provide a self-centering piston and spool arrangement. The seals 100, 102 are each formed of a tough resilient material of C-shaped half-section opening toward the outer cylinder compartments 54A, 56A such that upon directing fluid into the outer cylinder compartment to drive the piston axially, the perimeter of each seal 100, 102 expands radially outwardly against its liner 62, 64, and the trapped air in the inner cylinder compartment vents to atmosphere. Upon return of spool 16 to its center blocked port position of FIG. 1, both pilot operators are de-energized and the outer cylinder compartments 54A, 56A are exhausted (or vented to atmosphere when air is used as the supply fluid) through their common inlet and exhaust orifices 58, 60 and along the grooves 42 of their respective armature 40 which connect to the exhaust passage 28. During such return movement, the force exerted by the seals 100, 102 upon the liners 62, 64 approaches zero upon contraction of the seal material due to their inherent resiliency, thereby reducing the required return force which must be exerted on the spool 16. By virtue of the stainless steel construction of the liners 62, 64, a low friction surface is presented to the seals 100, 102, which further minimizes frictional resistance to spool movement, and the high strength aluminum spool construction provides for relatively low mass and low inertia to further reduce the minimum operating pressure required.

As noted, the specifically illustrated embodiment of this invention provides a valve spool and porting arrangement wherein all ports are blocked in the center spool position. To maintain proper centering of the spool in accordance with this invention, auxiliary fluid spring compartments 104, 106 are shown provided in the base portions 21, 21A of each pilot operator 18, 20 in coaxially aligned relation to the spool chamber 14 with a balancing member or spool centering piston 108, 110 projecting through end openings 112, 114 in the closed ends of the cylinders 54, 56 for engagement with opposite ends of spool 16. Each centering piston 108, 110 is fitted for reciprocating movement within its compartment 104, 106 which is in part provided with a suitable liner 116, 118. Each piston 108, 110 has an extension or rod 120, 122 projecting through the end opening 112, 114 and is normally biased into a rest position (FIG. 1) with a radial collar 124, 126 of each piston 108, 110 engaging the outer end wall of its respective compartment 54, 56 under the influence of a spool centering spring 128, 130. The latter each have one end seated on an outer wall of its spring compartment 104, 106, defined by a bushing 132, 134, and the opposite spring end being seated on a suitable cap 136, 138 attached to a rearwardly extending stem of its piston 108, 110. Undesired fluid leakage between the spring compartment 104, 106 and its respective cylinder 54, 56 is effectively minimized by the provision of a U cup packing seal 140, 142 fitted about the stem of its piston 108, 110 and which is of C-shaped half-section opening outwardly toward the outer portion of its spring compartment 104, 106. Each spool centering spring 128, 130 is selected with a spring rate sufficiently high to allow the centering spring force to overcome any frictional forces imposed on the spool 16 such as the forces exerted by the seals 100, 102 on the actuating pistons 96, 98 in addition to the minimum "O" ring frictional forces under zero gauge pressure conditions, i.e., zero gauge pressure being applied to supply port 52.

Figure 3:
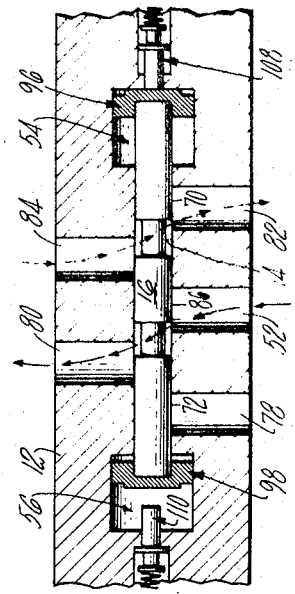
FIG. 3 is a view similar to FIG. 2 with the valve assembly in a second energized condition.

In accordance with still another aspect of this invention, the additional force requirements to ensure long run reliability under flow capacity conditions in a compact assembly with reduced minimum operating pressures is achieved by the provision of pilot passage 144, 146 directly connecting pilot valve compartments 32, 32A of the flow passageways 50, 50A and the spring compartment 104, 106. The connection of pilot passages 144, 146 with the spring compartments 104, 106 is formed at a juncture adjacent the liners 116, 118 within the spring compartments 104, 106 which is beyond the stroke limit position of the centering pistons 108, 110 upon their being displaced in a direction against their respective springs 128, 130 under the influence of the spool movement. The stroke limit position of each centering piston 110, 108 is determined by the extreme limit position of the spool 16 from its center rest position (FIG. 1) as established by engagement of pistons 98 and 96 respectively with the left and right hand end walls of cylinders 56 and 54 as viewed in FIGS. 2 and 3.

Figure 2:
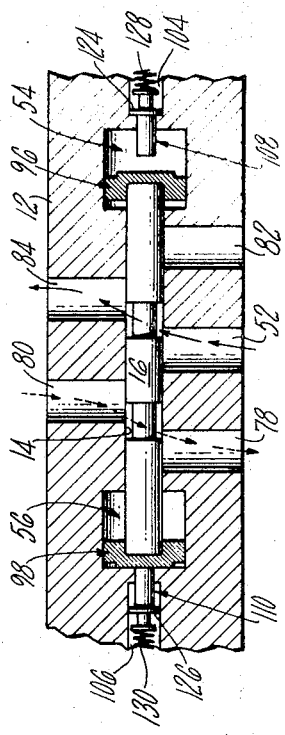
FIG. 2 is a partial longitudinal schematic view on a reduced scale showing fluid flow with the valve assembly in a first energized condition.

By virtue of the above described construction, as the supply inlet pressure increases, an additional spool actuating force is provided even under maximum fluid flow conditions, e.g., by the centering piston force which is directly proportional to the supply line pressure. Accordingly, with the coil of the pilot valve operator 20 de-energized, the common inlet and exhaust orifice 60 to the outer cylinder compartment 56A is closed off to the supply port 52 and will be understood to be connected to exhaust via the exhaust passage of the valve operator 20. The spool 16 may then be thrust from its center position to its extreme left hand limit position (FIG. 2) under differential pressure upon energization of pilot operator 18 whereby the relatively large pressure surface fo actuating piston 96 overcomes the force of the spool centering spring 130 and the centering force of balancing piston 110 which remains biased against actuating piston 98 under the influence of the inlet pressure of the supply fluid. As piston 96 is thrust to the left, the air ahead of piston 96 vents to atmosphere from the inner cylinder compartment 54B to shift spool 16 into its extreme left hand limit position, thereby introducing supply fluid into working cylinder port 84 and exhausting working port 80 through its exhaust port 78 (FIG. 2). It will be seen that the operating fluid pressure in the spring chambers 104, 106 is at a maximum substantially corresponding to the supply line inlet pressure, thereby additionally effecting a fluid cushion for spool 16 to at least partially absorb its impact upon its being shifted into its left hand position against the end wall of its outer cylinder compartment 56A provided by the base portion 21A of pilot operator 20. Upon de-energizing pilot valve operator 18, armature 40 returns under spring force into its illustrated normal position closing off the flow passageway 50 to the outer cylinder compartment 54A and exhausting it (or venting it to atmosphere when air is the supply fluid) through exhaust passage 28 to effect spool return under the influence of spring 130 with the assistance of the return fluid bias. With substantially identical balanced spring and fluid biasing forces being exerted on its opposite axial ends, spool 16 then is once again in accurately centered relationship to the ported body 12 to again effect closing and blocking of all ports.

Actuation of the left hand solenoid pilot valve operator 20 is the same as that described above in connection with the right hand solenoid pilot valve operator 18 but in reverse relation whereby the spool 16 is shifted into its right hand extreme limit position (FIG. 3) to introduce supply fluid into the other working port 80 and exhaust the previously pressurized working port 84 through its exhaust port 82.

The valve assembly of this invention effects a balanced centering of the valve spool under substantially identical but oppositely directed spring and fluid biasing forces by virtue of the disclosed auxiliary spring chamber arrangement provided at the opposite axial ends of the valve body. In addition, reliable center positioning of the spool is effected at any pressure within design limits for long run reliability and for meeting the flow capacity requirements and reduced minimum operating pressure requirements in a compact assembly capable of high speed valve operation with minimum power even when high axial forces on the spool are to be contended with under maximum fluid flow conditions.

As will be apparent to persons skilled in the art, various modifications, adaptations and variations of the foregoing specific disclosure can be made without departing from the teachings of the present invention.

I claim:

1. A valve assembly for connection to a supply source of fluid under pressure and comprising a body having a cylindrical chamber with ports opening into the chamber, a valve spool reciprocable in the chamber for controlling fluid flow between ports, fluid passage means for connecting the supply source with opposite ends of the chamber, selectively operable means for controlling the position of the spool including valve means in the passage means for connecting each end of the chamber alternately to exhaust and to the supply source, a compartment formed in the body adjacent each end of the chamber with each compartment being in continuous communication with the supply source, and a spool centering piston received in each compartment for reciprocation axially of the path of movement of the spool, the pistons each being biased toward the spool by fluid from the supply source and having an extension projecting into the chamber for engaging and centering the spool when the ends of the chamber are connected to exhaust.

2. The valve assembly of claim 1 further including a spring enclosed within each compartment and urging the spool centering piston axially toward the spool for engaging and centering the spool.

3. The valve assembly of claim 2 wherein the valve body establishes first and second stroke limit positions for the spool on opposite sides of a center rest position, and wherein the spring in each compartment has a spring rate sufficient to overcome any frictional forces exerted on the spool in the absence of differential fluid pressure forces being applied to the spool for moving the spool from its first and second stroke limit positions into its center rest position.

4. The valve assembly of claim 1 wherein the ports include a supply port opening into the chamber, wherein the passage means includes an internal flow passageway formed in the body for connecting the supply port with opposite ends of the chamber, and wherein a pilot passage is provided for connecting each compartment to the flow passageway at its respective end of the body in permanently open communication to the supply port.

5. The valve assembly of claim 4 wherein the pilot passage connecting each compartment to the supply port is internally formed in the valve body.

6. The valve assembly of claim 4 wherein the flow passageway includes a common inlet and exhaust orifice in each end of the chamber, wherein an exhaust passage is provided for communicating each common inlet and exhaust orifice at opposite ends of the chamber to exhaust, and wherein the valve means includes an independently operable pilot valve member in the flow passageway at each end of the body for controlling fluid flow through the flow passageway to the opposite ends of the chamber.

7. The valve assembly of claim 6 wherein an operator is provided at each end of the valve body for moving its respective pilot valve member between first and second flow control positions, each pilot valve member in said first position being in a normally closed position wherein the common inlet and exhaust orifice at its respective end of the chamber is connected to its exhaust passage and is closed to the supply port, each pilot valve member in said second position being in an open position wherein the common inlet and exhaust orifice at its respective end of the chamber is connected to the supply port and closed to its exhaust passage.

8. The valve assembly of claim 1 wherein each end of the spool has a piston of enlarged size relative to its spool centering piston with an annular seal of generally "C" shaped half-section fitted about each piston on the spool and opening toward its respective end of the chamber to provide sealing between the ends of the spool and the body, wherein a sealing subassembly having a series of "O" ring seals is mounted within the chamber between ports to surround the spool and provide perimeter sealing between the spool and the body, and wherein the compartment for each spool centering piston further includes a spring enclosed within the compartment urging the spool centering piston axially toward the spool for engaging the spool, the spring having a spring rate sufficient to overcome any frictional forces exerted by the "O" ring seals and the annular piston seals on the spool with zero gauge pressure being applied to the ports.

9. The valve assembly of claim 1 wherein the passage means includes a common inlet and exhaust orifice in each end of the chamber, and wherein the valve means comprises a solenoid pilot valve operator on each end of the body with each valve operator having an independently and selectively operable pilot valve member mounted in the passage means for movement between an open position, wherein the orifice at its respective end of the chamber is in communication with the supply source and shut off to exhaust, and a closed position, wherein the orifice at its respective end of the chamber is connected to exhaust and closed to the supply source.

10. The valve assembly of claim 9 wherein the pilot valve member at each end of the body is normally in closed position with the common inlet and exhaust orifices each being connected to exhaust upon de-energization of both solenoid pilot valve operators such that the spool may be centered by the spool centering pistons under the return fluid biases applied thereto.

11. A valve assembly comprising a body having a cylindrical chamber with ports including a supply port opening into the chamber, a valve spool axially reciprocable in the chamber between first and second stroke limit positions for controlling fluid flow between ports, the valve spool having a center rest position intermediate said first and second stroke limit positions, fluid passage means in he body for connecting opposite ends of the chamber to exhaust and to the supply port, valve means in the fluid passage means for selectively and independently connecting the ends of the chamber to exhaust and to the supply port, a pair of auxiliary compartments in operatively aligned adjacent relation to opposite ends of the chamber, and a pair of spool balancing members each having a piston of reduced size relative to the axial ends of the spool with the pistons reciprocably mounted within the compartments, respectively, the spool balancing members each having an extension projecting into the adjacent end of the chamber for engaging the spool, the fluid passage means establishing continuous communication between the supply port and the auxiliary compartments for continuously urging the balancing members toward engagement with opposite ends of the spool and applying balanced return forces thereon biasing the spool into its center rest position.

* * * * *